(12) United States Patent
Brunn et al.

(10) Patent No.: US 10,171,381 B2
(45) Date of Patent: *Jan. 1, 2019

(54) PROVIDING A GUEST WITH ACCESS TO CONTENT OF A SOCIAL NETWORK

(71) Applicant: International Business Machines Corporation, Armonk, NY (US)

(72) Inventors: Jonathan F. Brunn, Logan, UT (US); Jessica W. Forrester, Raleigh, NC (US); Stephen C. Hess, Durham, NC (US); Jeffrey R. Hoy, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/643,758

(22) Filed: Mar. 10, 2015

(65) Prior Publication Data

US 2015/0381524 A1 Dec. 31, 2015

Related U.S. Application Data

(63) Continuation of application No. 14/318,153, filed on Jun. 27, 2014.

(51) Int. Cl.
| | |
|---|---|
| *G06F 15/16* | (2006.01) |
| *H04L 12/927* | (2013.01) |
| *H04L 12/58* | (2006.01) |
| *H04L 29/08* | (2006.01) |
| *H04L 29/06* | (2006.01) |

(52) U.S. Cl.
CPC ............ *H04L 47/808* (2013.01); *H04L 51/24* (2013.01); *H04L 51/32* (2013.01); *H04L 63/08* (2013.01); *H04L 67/306* (2013.01)

(58) Field of Classification Search
CPC ..... G05Q 10/107; H04L 12/585; H04L 12/58; H04L 12/581
USPC ......................................................... 709/206
See application file for complete search history.

(56) References Cited

U.S. PATENT DOCUMENTS

2005/0160094 A1 * 7/2005 Morgenstern .......... G06Q 30/02
2009/0070852 A1 3/2009 Ryo et al.
(Continued)

FOREIGN PATENT DOCUMENTS

WO 2012137215 A1 10/2012

OTHER PUBLICATIONS

List of IBM Patents or Patent Applications Treated as Related, May 27, 2015, pp. 1-2.

*Primary Examiner* — Alan S Chou
(74) *Attorney, Agent, or Firm* — Fabian VanCott; Steven L. Nichols

(57) ABSTRACT

Providing a guest with access to content of a social network includes identifying a guest associated with content posted by a user on a social network, sending, via electronic mail (email), a notification to the guest's email address to notify the guest of the content on the social network, receiving, via an identity provider, an identity assertion associated with the guest's email address, and providing, based on the identity assertion, access to the content posted by the user on the social network to allow the guest to view the content, in which the identity provider is identified by a domain of the guest's email address.

17 Claims, 7 Drawing Sheets

(56) References Cited

U.S. PATENT DOCUMENTS

| | | | |
|---|---|---|---|
| 2009/0292814 A1* | 11/2009 | Ting | G06F 15/16 |
| | | | 709/229 |
| 2010/0037288 A1 | 2/2010 | Carraher et al. | |
| 2011/0047608 A1* | 2/2011 | Levenberg | H04L 63/0807 |
| | | | 726/7 |
| 2012/0324042 A1* | 12/2012 | Graham | G06Q 50/01 |
| | | | 709/217 |
| 2012/0324121 A1 | 12/2012 | Carr et al. | |
| 2013/0290426 A1* | 10/2013 | Sorensen | H04L 67/306 |
| | | | 709/204 |
| 2015/0100578 A1* | 4/2015 | Rosen | G06F 17/30598 |
| | | | 707/737 |
| 2017/0118207 A1* | 4/2017 | Madhu | H04L 63/0861 |

\* cited by examiner

300

| Mapping Library | |
| --- | --- |
| Email Address 304 | Identity Assertion 306 |
| GuestA@example.com 304-1 | Guest A Identity Assertion 306-1 |
| GuestB@example.com 304-2 | Guest B Identity Assertion 306-2 |
| GuestC@example.com 304-3 | Guest C Identity Assertion 306-3 |

*Fig. 3*

PROVIDING A GUEST WITH ACCESS TO CONTENT OF A SOCIAL NETWORK

BACKGROUND

The present invention relates to providing a guest with access to content, and more specifically, to providing a guest with access to content of a social network.

A social network is a web based application to enable a user to establish connections with other users such as friends, family, and colleagues in an online environment. Once a user is connected to other users, the users may share content with each other on the social network by uploading pictures, updating personal information, commenting on other user's information, among other activities. A social network uses an activity stream to display this information shared between the users. An activity stream allows a user to be aware of collaborative actions by other users.

BRIEF SUMMARY

A method for providing a guest with access to content of a social network includes identifying the guest associated with content posted by a user on a social network, sending, via electronic mail (email), a notification to the guest's email address to notify the guest of the content on the social network, receiving, via an identity provider, an identity assertion associated with the guest's email address, and providing, based on the identity assertion, access to the content posted by the user on the social network to allow the guest to view the content, in which the identity provider is identified by a domain of the guest's email address.

A system for providing a guest with access to content of a social network includes an identifying engine to identify a guest associated with content posted by a user on a social network, a hiding engine to hide a tag for the guest associated with the content on the social network until the guest is provided access to the content posted by the user on the social network, a sending engine to send, via email, a notification to the guest's email address to notify the guest of the content on the social network, a receiving engine to receive, via an identity provider, an identity assertion associated with the guest's email address, a mapping engine to map the identity assertion associated with the guest to the guest's email address, and a providing engine to provide, based on the identity assertion, access to the content posted by the user on the social network to allow the guest to view the content, in which the identity provider is identified by a domain of the guest's email address.

A computer program product includes a computer readable storage medium, the computer readable storage medium having computer readable program code embodied therewith. The computer readable program code having computer readable program code to identify a guest associated with content posted by a user on a social network, hide a tag for the guest associated with the content on the social network until the guest is provided access to the content posted by the user on the social network, send, via email, a notification to the guest's email address to notify the guest of the content on the social network, receive, via an identity provider, an identity assertion associated with the guest's email address, and provide, based on the identity assertion, access to the content posted by the user on the social network to allow the guest to view the content, in which the identity provider is identified by a domain of the guest's email address.

BRIEF DESCRIPTION OF THE SEVERAL VIEWS OF THE DRAWINGS

The accompanying drawings illustrate various examples of the principles described herein and are a part of the specification. The examples do not limit the scope of the claims.

FIG. 3 is a flowchart of an example of a mapping library, according to one example of principles described herein.

Throughout the drawings, identical reference numbers designate similar, but not necessarily identical, elements.

DETAILED DESCRIPTION

Figure 1:
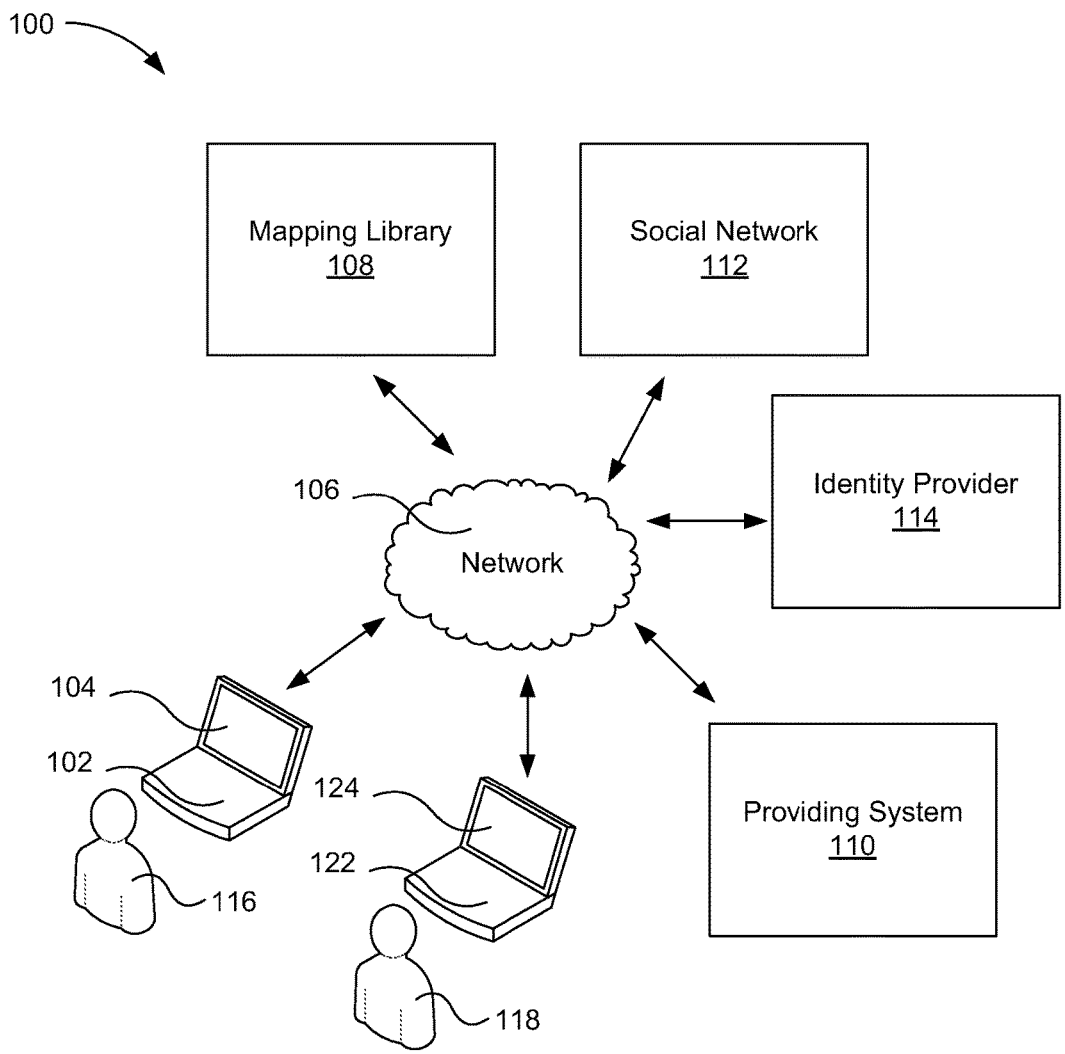
FIG. 1 is a diagram of an example of a system for providing a guest with access to content of a social network, according to one example of principles described herein.

The present specification describes a method and system for providing a guest with access to content of a social network, such that the guest does not have to have an account with the social network in order to access the content associated with the user on the social network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a social network is a web based application to enable a user to establish connections with other users such as friends, family, and colleagues in an online environment. Once a user is connected to other users, the users may share content with each other on the social network by uploading pictures, updating personal information, commenting on other user's information, among other activities. A social network uses an activity stream to display this information shared between the users. An activity stream allows a user to be aware of collaborative actions by other users.

Often, when posting content on a social network, a user desires to share the content with guests who do not have an account with the social network. However, in order view the content on the social network, the guest is to create an account. If the guest does not desire to create an account, the guest is prohibited from viewing the content on the social network. As a result, the content is not shared with the guest.

The principles described herein include a system and a method for providing a guest with access to content of a social network. Such a system and method includes identifying a guest associated with content posted by a user on a social network, sending, via electronic mail (email), a notification to the guest's email address to notify the guest of the content on the social network, receiving, via an identity provider, an identity assertion associated with the guest's email address, and providing, based on the identity assertion, access to the content posted by the user on the social network to allow the guest to view the content, in which the identity provider is identified by a domain of the guest's email address. Such a method and system allows a guest to view content on a social network even though the guest does not have an account with the social network. As a result, the guest does not have to create an account with the social network in order to access the content associated with the guest on the social network.

In the specification and appended claims, the term "user" is meant to be understood broadly as an individual, an organization, a group, or a business that has a registered account with a social network. In one example, the user may establish connections with other users such as friends, family, and colleagues in the social network. The users may share content with each other and guests on the social network by uploading pictures, tagging guest and other users, updating personal information, commenting on other user's information, among other activities.

In the specification and appended claims, the term "guest" is meant to be understood broadly as an individual, an organization, a group, or a business that does not have a registered account with any social networks. In one example, the guest may access content that is associated with the guest if a user tags the user in the content.

In the specification and appended claims, the term "content" is meant to be understood broadly as an item that is uploaded to a social network that can be associated with a guest, a user, or combinations thereof. In one example, content may include a file, an image, a video, a message, audio, a document, a post, an invite, other content, or combinations thereof.

In the specification and appended claims, the term "identity assertion" is meant to be understood broadly as a mechanism used to authenticate a guest in order to provide the guest with access to content on a social network that is associated with the guest. In one example, the identity assertion for the guest may be based on the guest's login and password, an email, a credential provider such as a third party credential provider, other mechanisms, or combinations thereof.

In the specification and appended claims, the term "identity provider" is meant to be understood broadly as an organization, a group, or a business that authenticates the identity assertion of a guest. In one example, the identity provider may be a third party. Further, the identity provider may use an open standard for authorization such as OpenID or OAuth. Further, the identity provider may be identified by a domain of the guest's email address.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of an example of a system for providing a guest with access to content of a social network, according to one example of principles described herein. As will be described below, a providing system is in communication with a network to identify a guest associated with content posted by a user on a social network. The providing system further sends, via email, a notification to the guest's email address to notify the guest of the content on the social network. Further, the providing system receives, via an identity provider, an identity assertion associated with the guest's email address. The providing system further provides, based on the identity assertion, access to the content posted by the user on the social network to allow the guest to view the content.

As illustrated in FIG. 1, the system (100) includes a social network (112). The social network (112) is a web based application to enable a user (116) to establish connections with other users such as friends, family, and colleagues in an online environment via a user device (102). In one example, the user (116) may be an individual, an organization, a group, or a business that has a registered account for a social network (112). To access the social network (112), the user (116) registers with the social network (112) via the user device (102). As a result of registering with the social network (112), the user creates an account. Once the user (116) is registered and connected to other users, the users may share content with each other on the social network by uploading pictures, updating personal information, commenting on other user's information, among other activities. Further, the social network (112) uses an activity stream to display this information shared between the users on a display (104) of the user device (102). As a result, the activity stream allows the user (116) to be aware of collaborative actions by other users. In one example, the user (116) may post, via the user device (102), content that is associated with a guest (118).

As illustrated in FIG. 1, the system (100) includes a providing system (110). The providing system (110) identifies the guest (118) associated with content posted by a user on the social network (112). In one example, the guest may be an individual, an organization, a group, or a business that does not have an account with the social network (112). Further, the content may be a file, an image, a video, a message, audio, a document, a post, an invite, or combinations thereof.

The providing system (110) further sends, via email, a notification to the guest's email address to notify the guest of the content on the social network (112). In one example, the providing system (110) sends one notification for each piece of content that the guest is associated with. In another example, the providing system (110) sends one notification for all the content that the guest is associated with.

Further, the providing system (110) receives, via an identity provider (114), an identity assertion associated with the guest's email address. In one example, the identity provider (114) may be a third party identity provider that is able to validate the guest's identity assertion. In one example, once the guest's identity assertion is validated, the providing system (110) maps the identity assertion associated with the guest to the guest's email address in a mapping library (108).

The providing system (110) further provides, based on the identity assertion, access to the content posted by the user (116) on the social network (112) to allow the guest (118) to view the content. In this example, the guest (118) may view the content via a display (124) on the guest device (122).

While this example has been described with reference to the providing system, the mapping library, and the identity provider being located over the network, the providing system, the mapping library, and the identity provider, may be located in any appropriate location. For example, the providing system, the mapping library, and the identity provider may be located in a user device, a guest device, a database, an identity provider, other locations, or combinations thereof.

While this example has been described with reference to the providing system sending, via email, a notification to the guest's email address to notify the guest of the content on the social network, the notification may be sent via other methods as long as the identity provider may validate the guest's identity assertion. For example, the notification may be sent via text message, short message service, an application, other methods, or combinations thereof.

Figure 2A:
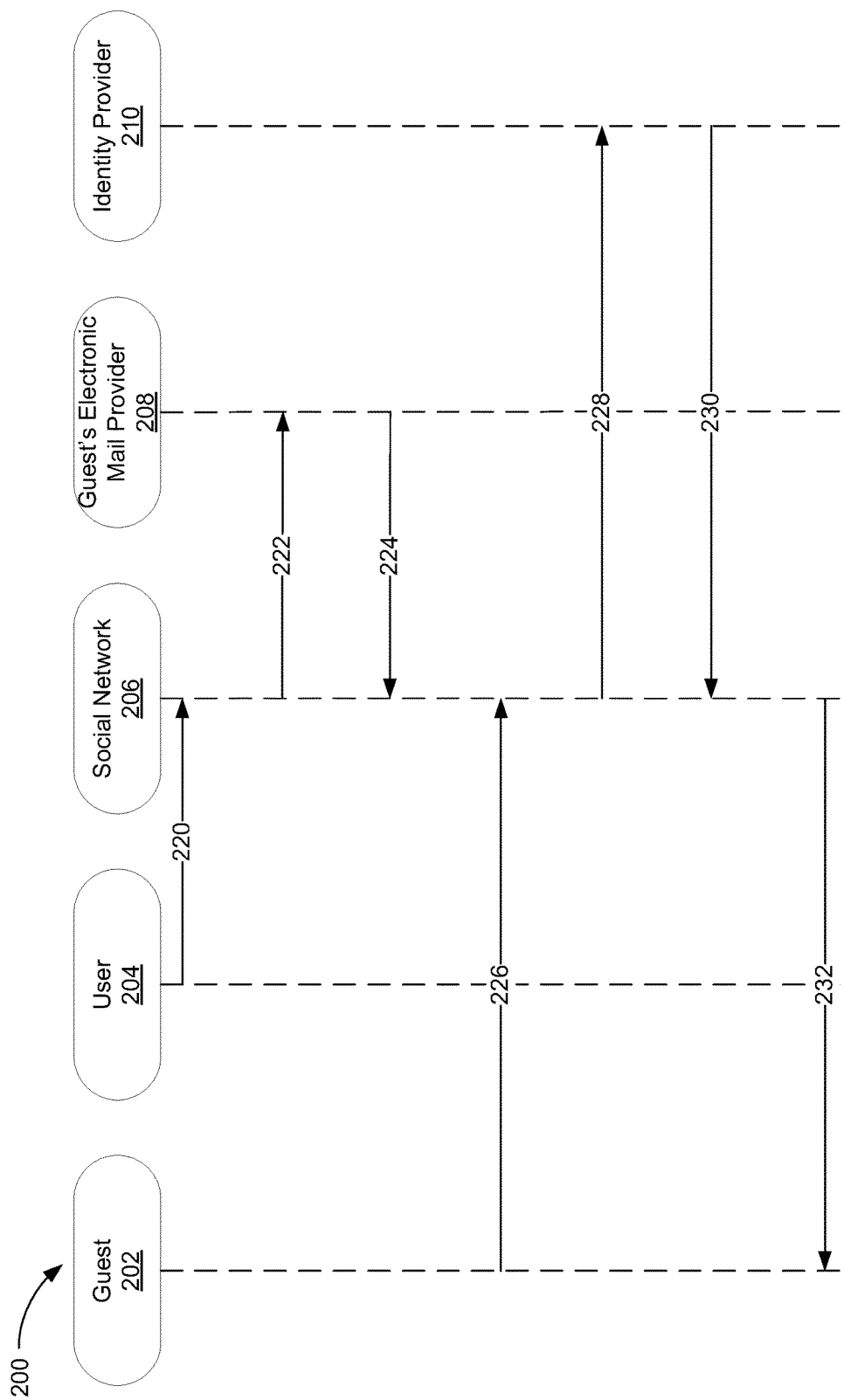
FIG. 2A is a diagram of an example of a sequence for providing a guest with access to content of a social network, according to one example of principles described herein.

FIG. 2A is a diagram of an example of a sequence for providing a guest with access to content of a social network, according to one example of principles described herein. As will be described below, the sequence may be determined by the providing system of FIG. 1 to provide a guest with access to content of a social network.

As illustrated, the sequence (200) includes a user (204). In this example, the user (204) tags a guest (202) in content such as an image via a social network (206) as indicated by arrow 220. As mentioned above, the providing system of FIG. 1 identifies the guest (202) associated with content posted by the user (204) on a social network (206).

Once identified, the providing system of FIG. 1 sends, via email, a notification to the guest's email address (202) to notify the guest of the content on the social network (206). As illustrated in the sequence (200), the notification is sent to the guest's email provider (208) as illustrated by arrow 222.

Further, the providing system of FIG. 1 receives, via an identity provider (210), an identity assertion associated with the guest's email address and maps the guest's identity assertion as indicated by arrow 224.

The providing system further provides, based on the identity assertion, access to the content posted by the user (204) on the social network (206) to allow the guest (202) to view the content. For example, the guest (202) logs in with identity assertion to the social network (206) as indicated by arrow 226. The social network (206) validates the guest's identity assertion via the identity provider (210) as indicated by arrow 228.

In one example, the identity provider (210) may use an open standard such as OAuth for authorization. OAuth provides client applications a secure delegated access to server resources on behalf of a resource owner. It specifies a process for resource owners to authorize third-party access to their server resources without sharing their identity assertion. Designed specifically to work with Hypertext Transfer Protocol (HTTP), OAuth allows access tokens to be issued to third-party clients by an authorization server, with the approval of the resource owner, or end-user. The client then uses the access token to access the protected resources hosted by the resource server.

In another example, the identity provider (210) may use an open standard such as OpenID. OpenID is an open standard that allows guests to be authenticated by certain co-operating sites using a third party service, eliminating the need for webmasters to provide their own ad hoc systems and allowing guests to consolidate their digital identities. In one example, the guests create accounts with their preferred OpenID identity providers, and then use those accounts as the basis for signing on to any website which accepts OpenID authentication, such as the social network (206).

Once, the guest's identity assertion are validated via the identity provider (210), as indicated by arrow 230, the social network (206) provides the guest (202) with access to the content posted by the user (204) on the social network (206) as indicated by arrow 232.

Figure 2B:
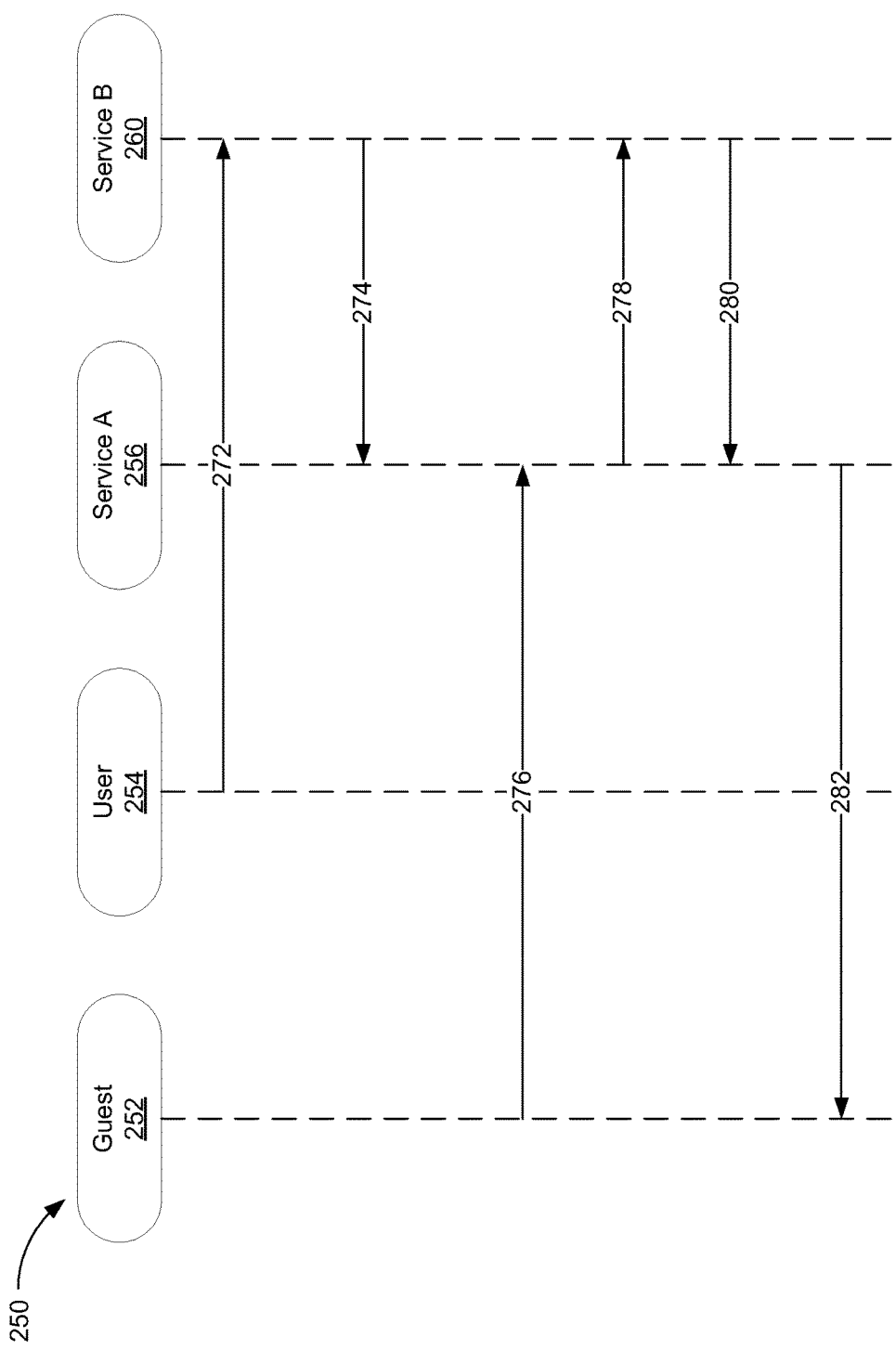
FIG. 2B is a diagram of an example of an alternate sequence for providing a guest with access to content of a social network, according to one example of principles described herein.

FIG. 2B is a diagram of an example of an alternate sequence for providing a guest with access to content of a social network, according to one example of principles described herein. The sequence of FIG. 2B may be a generalized flow of FIG. 2A via different methods and techniques. As will be described below, the sequence may be determined by the providing system of FIG. 1 to provide a guest with access to content of a social network.

As illustrated, the sequence (250) includes a user (254) and a guest (252). In this example, the user (254) requests the guest's identity provider token from service B (260) to create a tag as indicated by arrow 272. In this example, service B (260) may be a contacts provider and/or an identity provider. Service B (260) responds with the guest's identity provider token which service A (256) uses to create the tag and a mapping between the guest's name and the identity provider token as indicated by arrow 274. In this example, service A (256) may be a social network. In one example, these processes may be executed by the providing system of FIG. 1.

The providing system further provides, based on the identity assertion, access to the content posted by the user (254) on service A (256) to allow the guest (252) to view the content. For example, the guest (252) logs in with identity assertion to service A (256) as indicated by arrow 276. Service A (256) validates the guest's identity assertion via service B (260) as indicated by arrow 278.

In one example, service B (260) may use OAuth or OpenID as described above to validate the guest's identity assertion. Once, the guest's identity assertion are validated via service B (260), as indicated by arrow 280, service A (256) provides the guest (252) with access to the content posted by the user (254) on service A (256) as indicated by arrow 282.

FIG. 3 is a flowchart of an example of a mapping library, according to one example of principles described herein. As mentioned above, the providing system of FIG. 1 receives identity assertions associated with the guest via an identity provider. In one example, the identity provider may be a third party identity provider that is able to validate the guest. In one example, once the guest's identity assertion is validated, the providing system maps the identity assertion associated with the guest to the guest's email address in a mapping library. In one example, the identity assertion may be a token provided by the identity provider.

As illustrated in FIG. 3, the mapping library (300) includes a number of guests associated with email addresses (304). For example, guest A has an email address of GuestA@example.com (304-1). Guest B has an email address of GuestB@example.com (304-2). Guest C has an email address of GuestC@example.com (304-3).

In one example, the providing system of FIG. 1 maps identity assertions (306) associated with the guest to the email address (304) of the guest. For example, guest A identity assertion (306-1) is associated with guest A and is mapped to GuestA@example.com (304-1). Similarly, guest B identity assertion (306-2) is associated with guest B and is mapped to GuestB@example.com (304-2). Further, guest C identity assertion (306-3) is associated with guest C and is mapped to GuestC@example.com (304-3).

Further, the identity assertion (306) associated with the guest (302) may include a username, a password, the email address (304), or combinations thereof. Once, the providing system of FIG. 1 maps the identity assertion (306) associated with the guests (302) to the email addresses (304) of the guest (302) in the mapping library (300), the user may access the content of the social network.

Figure 4:
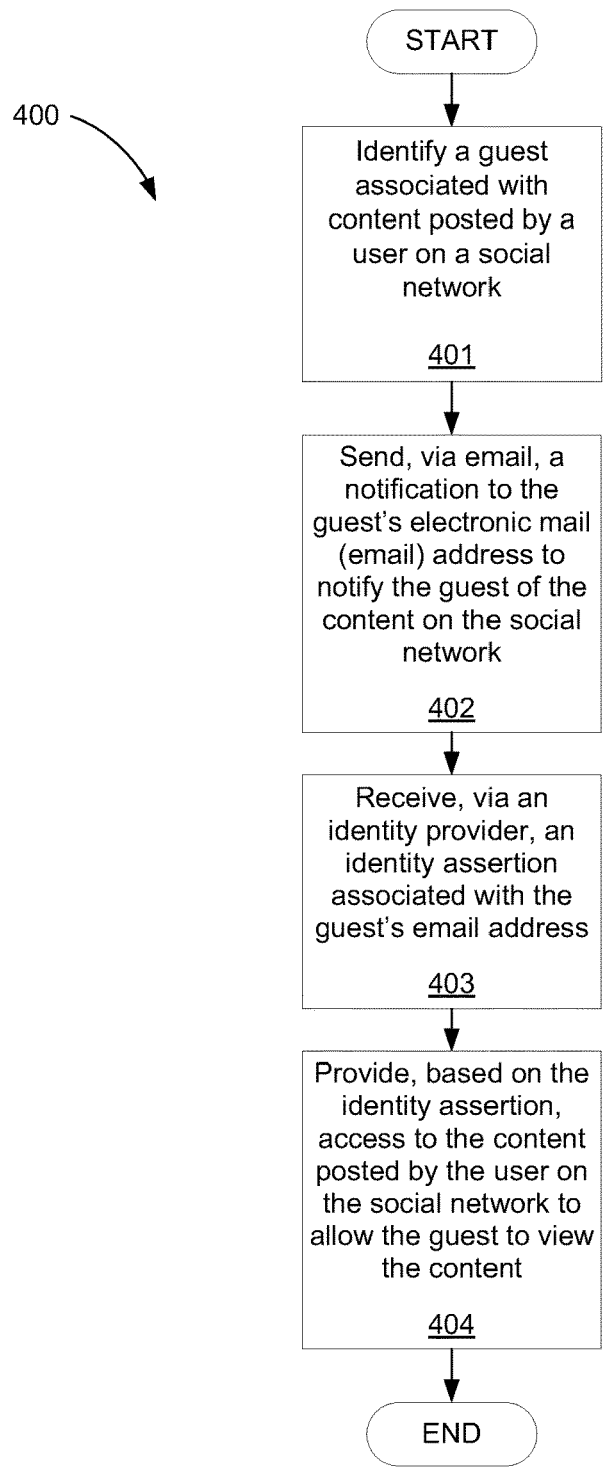
FIG. 4 is a flowchart of an example of a method for providing a guest with access to content of a social network, according to one example of principles described herein.

FIG. 4 is a flowchart of an example of a method for providing a guest with access to content of a social network, according to one example of principles described herein. In one example, the method (400) may be executed by the providing system (100) of FIG. 1. In other examples, method (400) may be executed by other systems (i.e. system 600 and system 700). In this example, the method (400) includes identifying (401) a guest associated with content posted by a user on a social network, sending (402), via email, a notification to the guest's email address to notify the guest of the content on the social network, receiving (403), via an identity provider, an identity assertion associated with a guest's email address, and providing (404), based on the identity assertion, access to the content posted by the user on the social network to allow the guest to view the content.

As mentioned above, the method (400) includes identifying (401) a guest associated with content posted by a user on a social network. In one example, the guest may be an individual, an organization, a group, or a business that does not have a registered account for a social network. As mentioned above, the content may include a file, an image, a video, a message, audio, a document, a post, an invite, or combinations thereof.

In one example, the guest may be identified directly or indirectly. For example, the user may identify the guest associated with the content by entering the guest's email address into a user interface (UI). In another example, the user may identify the guest associated with the content by entering the guest's phone number, full name, or combinations thereof into the UI. In yet another example, the providing system of FIG. 1 may identify the guest associated with the content via other method and techniques such as facial recognition if the content is an image or a video. In still another example, the social network may integrate the user's email provider to provide a type ahead search on names and emails for other users and/or guests. In one example, the guest's email address is obtained from an address book, a contact list, or combinations thereof that is associated with the identity provider. In one example, the identity provider is identified by the domain of the email address of the guest. For example, if a guest's email address is guestA@companyX.com, companyX's identity provider is used. As a result, the identity provider may be the source of the address book, the contact list, or combinations thereof.

As mentioned above, the method (400) includes sending (402), via email, a notification to the guest's email address to notify the guest of the content on the social network. In one example, the notification includes a message indicating the guest is tagged in content on a social network and the notification may further include a hyper link or a multipurpose internet mail extension (MIME) type.

In this example, when the guest accesses the hyper link, the hyper link allows the guest to access an identity provider. The identity provider allows the guest to log in and/or specify identity assertion such that the identity provider validates the guest. For example, the guest may provide the identity provider with an email address and a password.

In one example, the MIME type may be an internet standard that extends the format of emails to support. Further, the MIME type may be used by the guest's email provider to recognize the notification as a request for access to the content of the social network that is associated with the guest.

While this example has been described with reference to the providing system sending, via email, a notification to the guest's email address to notify the guest of the content on the social network, the notification may be sent via other methods as long as the identity provider may validate the guest's identity assertion. For example, the notification may be sent via text message, short message service, an application, other methods, or combinations thereof.

As mentioned above, the method (400) includes receiving (403), via an identity provider, an identity assertion associated with the guest's email address. As mentioned above, the identity assertion associated with the guest includes a user-name, a password, the email address, or combinations thereof. In another example, the identity assertion associated with the guest may include a specific user device, a media access control address (MAC), other identity assertion, or combinations thereof.

In one example, receiving, via the identity provider, the identity assertion associated with the guest's email address includes manually receiving the identity assertion associated with the guest. Manually receiving the identity assertion associated with the guest includes the guest manually entering the identity assertion for the identity provider. In this example, the guest may choose the identity provider to utilize.

In one example, receiving, via the identity provider, the identity assertion associated with the guest's email address includes receiving the identity assertion associated with the guest based on rules established by the guest. In one example, the method (400) automatically receives the identity assertion associated with the guest based on rules established by the guest. For example, the guest may rules to define when the providing system of FIG. 1 is allowed to receive the identity assertion associated with the guest via the identity provider. Further, the rules may define that the providing system of FIG. 1 is to receive the identity assertion associated with the guest via the identity provider according to an event, such as the guest being tagged in content by a specific user. In this example, the guest may choose the identity assertion provider to utilize.

In one example, if the guest does not have identity assertion already, the method (400) may allow the user to access an identity provider. In this example, the identity provider allows the guest to create identity assertion.

As mentioned above, the method (400) includes providing (404), based on the identity assertion, access to the content posted by the user on the social network to allow the guest to view the content. In one example, once the identity assertion of the guest is verified by the identity provider, the guest may access the content that is associated with them on the social network. If the identity assertion of the guest cannot be verified by the identity provider, the guest may not access the content that is associated with them on the social network.

In one example, the next time the guest is tagged in content by the user, the user doesn't have to provide the guest's email address again because the social network already has the guest's email address stored in the mapping library. However, the guest still needs to use their third party authentication to gain access to the new tagged content.

Figure 5:
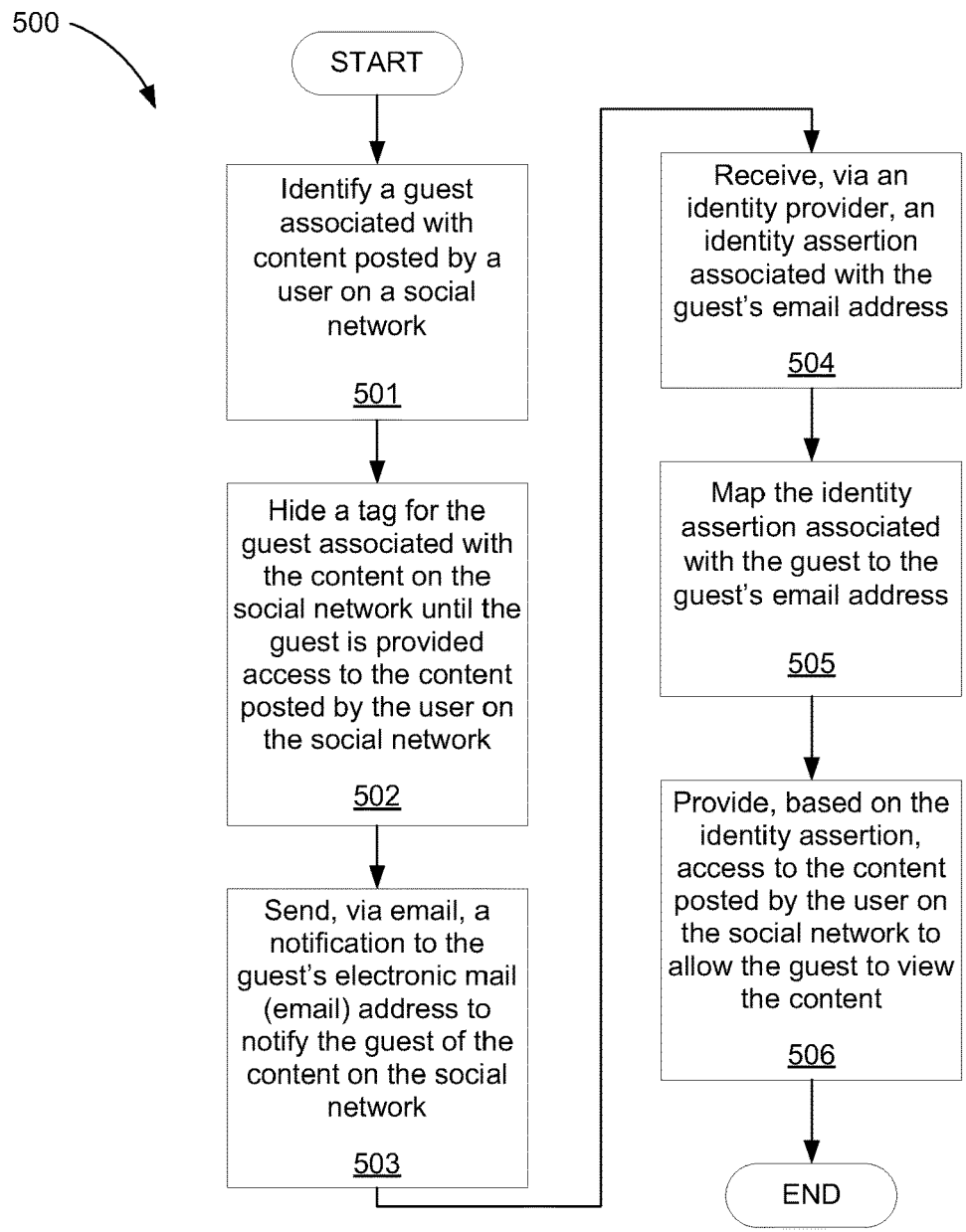
FIG. 5 is a flowchart of an example of a method for providing a guest with access to content of a social network, according to one example of principles described herein.

FIG. 5 is a flowchart of an example of a method for providing a guest with access to content of a social network, according to one example of principles described herein. In one example, the method (500) may be executed by the providing system (100) of FIG. 1. In other examples, the method (500) may be executed by other systems (i.e. system 600 and system 700). In this example, the method (500) includes identifying (501) a guest associated with content posted by a user on a social network, hiding (502) a tag for the guest associated with the content on the social network until the guest is provided access to the content posted by the user on the social network, sending (503), via email, a notification to the guest's email address to notify the guest of the content on the social network, receiving (504), via an identity provider, and identity assertion associated with the guest's email address, mapping (505) the identity assertion associated with the guest to the guest's email address, and providing (506), based on the identity assertion, access to the content posted by the user on the social network to allow the guest to view the content.

As mentioned above, the method (500) includes hiding (502) a tag for the guest associated with the content on the social network until the guest is provided access to the content posted by the user on the social network. In one example, the guest may not want to be tagged in the content. As a result, the guest is not tagged in the content until the guest is provided access to the content posted by the user on the social network.

As mentioned above, the method (500) includes mapping (505) the identity assertion associated with the guest to the guest's email address. As mentioned in FIG. 3, the mapping library includes a number of guest's email addresses associated with a number of guests. For example, guest A has an email address of GuestA@example.com. Guest B has an email address of GuestB@example.com. Guest C has an email address of GuestC@example.com.

In one example, the providing system of FIG. 1 maps identity assertion associated with the guest to the guest's email address. For example, guest A's identity assertion is associated with guest A and is mapped to GuestA@example.com. Similarly, guest B's identity assertion is associated with guest B and is mapped to GuestB@example.com. Further, guest C's identity assertion is associated with guest C and is mapped to GuestC@example.com.

Further, the identity assertion associated with the guest may include username, a password, the email address, or combinations thereof. Once, the providing system of FIG. 1 maps the identity assertion associated with the guests to the email addresses of the guest in the mapping library, the user may access the content of the social network.

In one example, the guest may have several identity assertion and/or several email address. As a result, the method (500) can map any number of identity assertions to any number of email addresses for each guest.

Figure 6:
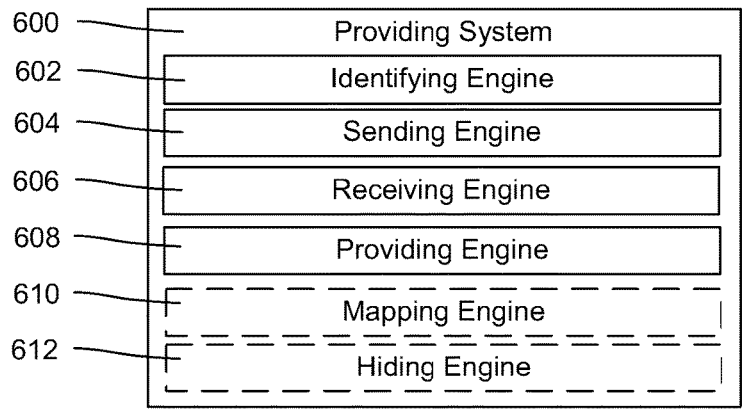
FIG. 6 is a diagram of an example of a providing system, according to the principles described herein.

FIG. 6 is a diagram of an example of a providing system, according to the principles described herein. The providing system (600) includes an identifying engine (602), a sending engine (604), a receiving engine (606), and a providing engine (608). In this example, the providing system (600) also includes a mapping engine (610) and a hiding engine (612). The engines (602, 604, 606, 608, 610, 612) refer to a combination of hardware and program instructions to perform a designated function. Each of the engines (602, 604, 606, 608, 610, 612) may include a processor and memory. The program instructions are stored in the memory and cause the processor to execute the designated function of the engine.

The identifying engine (602) identifies a guest associated with content posted by a user on a social network. As mentioned above, the content includes a file, an image, a video, a message, audio, a document, a post, an invite, or combinations thereof.

The sending engine (604) sends, via email, a notification to the guest's email address to notify the guest of the content on the social network. As mentioned above, the notification includes a hyper link or a MIME type.

The receiving engine (606) receives, via an identity provider, an identity assertion associated with the guest's email address. In one example, the receiving engine (606) receives, via the identity provider, the identity assertion associated with the guest's email address by manually receiving the identity assertion associated with the guest or receiving the identity assertion associated with the guest based on rules established by the guest. As mentioned above, the identity assertion associated with the guest includes a username, a password, the email address, or combinations thereof.

The providing engine (608) provides, based on the identity assertion, access to the content posted by the user on the social network to allow the guest to view the content. In one example, the providing engine (608) provides, based on the identity assertion, access to the content posted by the user on the social network to allow the guest to view the content for a specific amount of time.

The mapping engine (610) maps the identity assertion associated with the guest to the guest's email address. In one example, the mapping engine (610) maps the identity assertion associated with the guest to one email addresses of the guest. In another example, the mapping engine (610) maps the identity assertion associated with the guest to several email addresses of the guest. In one example, the identity assertion may that is mapped in the mapping library may be a token from the identity provider.

The hiding engine (612) hides a tag for the guest associated with the content on the social network until the guest is provided access to the content posted by the user on the social network. In one example, the hiding engine (612) hides all tags for the guest associated with the content on the social network until the guest is provided access to the content posted by the user on the social network. In another example, the hiding engine (612) hides one tag for the guest associated with the content on the social network until the guest is provided access to the content posted by a specific user on the social network.

Figure 7:
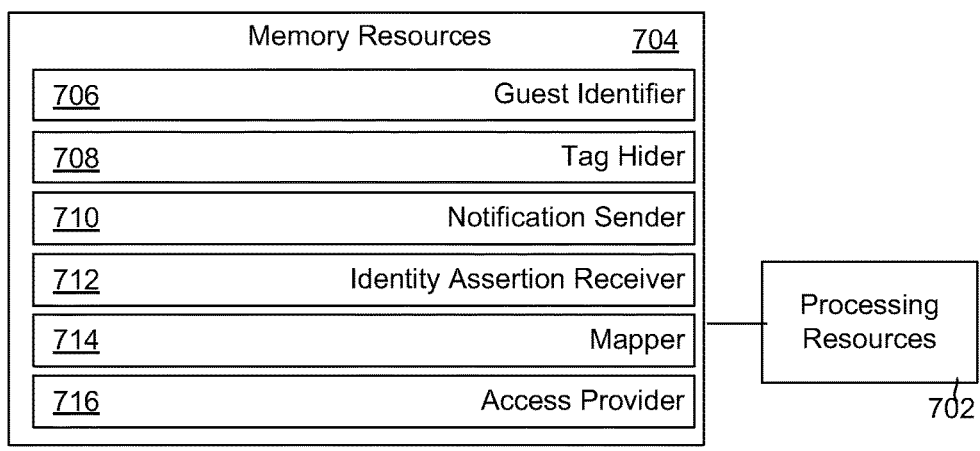
FIG. 7 is a diagram of an example of a providing system, according to the principles described herein.

FIG. 7 is a diagram of an example of a providing system, according to the principles described herein. In this example, the providing system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the providing system (700). The programmed instructions shown stored in the memory resources (704) include a guest identifier (706), a tag hider (708), a notification sender (710), an identity assertion receiver (712), a mapper (714), and an access provider (716).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The guest identifier (706) represents programmed instructions that, when executed, cause the processing resources (702) to identify a guest associated with content posted by a user on a social network. The tag hider (708) represents programmed instructions that, when executed, cause the processing resources (702) to hide a tag for the guest associated with the content on the social network until the guest is provided access to the content posted by the user on the social network.

The notification sender (710) represents programmed instructions that, when executed, cause the processing resources (702) to send, via email, a notification to the guest's email address to notify the guest of the content on the social network. The identity assertion receiver (712) represents programmed instructions that, when executed, cause the processing resources (702) to receive, via an identity provider, an identity assertion associated with the guest's email address.

The mapper (714) represents programmed instructions that, when executed, cause the processing resources (702) to map the identity assertion associated with the guest to the guest's email address. The access provider (716) represents programmed instructions that, when executed, cause the processing resources (702) to provide, based on the identity assertion, access to the content posted by the user on the social network to allow the guest to view the content.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the providing system (700) may be implemented on a user device, on a server, on a collection of servers, or combinations thereof.

The providing system (700) of FIG. 7 may be part of a general purpose computer. However, in alternative examples, the providing system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for providing a guest with access to content of a social network, the method comprising:

identifying a guest associated with content posted by a user on a social network, where the guest is not a member with access to the social network;

sending, via electronic mail (email), a notification to the guest's email address to notify the guest of the content on the social network;

receiving, via an identity provider, an identity assertion associated with the guest's email address; and providing, based on the identity assertion, access to the content posted by the user on the social network to allow the guest to view the content;

hiding a tag for the guest associated with the content on the social network until the guest is provided access to the content posted by the user on the social network.

2. The method of claim 1, further comprising mapping the identity assertion associated with the guest to the guest's email address.

3. The method of claim 1, in which the guest's email address is obtained from an address book, a contact list, or combinations thereof that is associated with the identity provider.

4. The method of claim 1, in which the notification comprises a hyper link or a multipurpose internet mail extension (MIME) type.

5. The method of claim 1, in which receiving, via the identity provider, the identity assertion associated with the guest's email address comprises manually receiving the identity assertion associated with the guest or receiving the identity assertion associated with the guest based on rules established by the guest.

6. The method of claim 1, in which the identity assertion associated with the guest comprises a username, a password, the email address, or combinations thereof.

7. The method of claim 1, wherein the identity provider is identified by a domain of the guest's email address.

8. A method for providing a guest with access to content of a social network, the method comprising:

determining an address for a non-member guest, who is not a member with access to a social network, but who is identified in association with content posted on the social network by a user of the social network;

sending an electronic notification of the content posted by the user to the non-member guest at the determined address of the non-member guest;

obtaining an identity assertion mechanism that authenticates identity of the non-member guest, wherein the identity assertion mechanism authenticates the identity of the non-member guest using facial recognition based on the content;

based on the identity assertion mechanism, providing the non-member guest with access to the content posed by the user on the social network that is associated with the non-member guest; and hiding a tag for the guest associated with the content on the social network until the guest is provided access to the content posted by the user on the social network.

9. The method of claim 8, further comprising using a tag associated with the content posted by the user to identify the non-member guest associated with the content.

10. The method of claim 9, wherein the tag comprises an identity provider token of the non-member guest that was obtained by the user when creating the tag identifying the non-member guest.

11. The method of claim 9, wherein the notification is a text message.

12. The method of claim 9, wherein the notification is an email message.

13. The method of claim 9, wherein the notification is sent using a messaging application.

14. A method for providing a guest with access to content of a social network, the method comprising:

reading a tag created by a user in association with content posted by the user to a social network, the tag identifying a guest referenced in the content posted by the user, where the guest is not a member with access to the social network;

based on the tag, identifying an electronic address for the non-member guest;

sending an electronic notification of the content posted by the user to the non-member guest at the determined address of the non-member guest;

obtaining an identity assertion mechanism that authenticates an identity of the non-member guest;

authenticating the non-member guest using the identity assertion mechanism; and in response to properly authenticating the non-member guest, providing the non-member guest with access to the content posted by the user on the social network;

with a hiding engine, hiding a tag for the guest associated with the content on the social network until the guest is provided access to the content posted by the user on the social network.

15. The method of claim 14, wherein the tag comprises an identity provider token of the non-member guest that was obtained by the user when creating the tag identifying the non-member guest.

16. The method of claim 14, wherein the notification is a text message.

17. The method of claim 14, wherein the notification is an email message.

* * * * *